(12) United States Patent
Deiml et al.

(10) Patent No.: US 12,461,159 B2
(45) Date of Patent: Nov. 4, 2025

(54) METHOD FOR PROTECTING A BATTERY DEVICE

(71) Applicant: AVL List GmbH, Graz (AT)

(72) Inventors: Mathias Deiml, Donaustauf (DE); Günther Frizberg, Graz (AT); Kurt Gschweitl, Eggersdorf (AT); Vipul Dhingra, Graz (AT)

(73) Assignee: AVL List GmbH, Graz (AT)

( * ) Notice: Subject to any disclaimer, the term of this patent is extended or adjusted under 35 U.S.C. 154(b) by 590 days.

(21) Appl. No.: 17/604,481

(22) PCT Filed: Apr. 16, 2020

(86) PCT No.: PCT/AT2020/060155
§ 371 (c)(1),
(2) Date: Oct. 18, 2021

(87) PCT Pub. No.: WO2020/210853
PCT Pub. Date: Oct. 22, 2020

(65) Prior Publication Data
US 2022/0196751 A1   Jun. 23, 2022

(30) Foreign Application Priority Data
Apr. 17, 2019 (AT) .............. A 50350/2019

(51) Int. Cl.
*G01R 31/3832* (2019.01)
*G01R 31/367* (2019.01)
(Continued)

(52) U.S. Cl.
CPC ....... *G01R 31/3832* (2019.01); *G01R 31/367* (2019.01); *G01R 31/385* (2019.01); *G01R 31/392* (2019.01)

(58) Field of Classification Search
CPC .............. G01R 31/3832; G01R 31/385; G01R 31/392; G01R 31/367
See application file for complete search history.

(56) References Cited

U.S. PATENT DOCUMENTS

2006/0170397 A1   8/2006   Srinivasan et al.

FOREIGN PATENT DOCUMENTS

| EP | 2551689 A2 * | 1/2013 | ........... G01R 31/367 |
| JP | 5924516 B2 * | 5/2016 | |
| JP | 2016-181384 | 10/2016 | |

OTHER PUBLICATIONS

Bessman et al. "Challenging Sinusoidal Ripple-Current Charging of Lithium-Ion Batteries", IEEE Transactions on Industrial Electronics, 65(6):4750-4757, XP011677210, Nov. 13, 2017.

(Continued)

*Primary Examiner* — Lam S Nguyen (57) ABSTRACT

The invention relates to a method for protecting a battery device (100), in particular an electrode of the battery device (100), having the following steps: determining at least one electrical battery parameter (EBP) of the battery device (100), determining an operating parameter (BP) of an operating current (IB) of the battery device, calculating a disturbance parameter (SP) for a disturbance current (IS) on the basis of the operating parameter (BP), generating the disturbance current (IS), and applying the disturbance current (IS) to the operating current (IB).

16 Claims, 4 Drawing Sheets

(51) Int. Cl.
*G01R 31/385* (2019.01)
*G01R 31/392* (2019.01)

(56) References Cited

OTHER PUBLICATIONS

Chen et al. "Sinusoidal-Ripple-Current Charging Strategy and Optimal Charging Frequency Study for Li-Ion Batteries", IEEE Transactions on Industrial Electronics, 60(1):88-97, Jan. 26, 2012.
Hossein "Battery Impedance Measurement Using Sinusoidal Ripple Current Emulator", IEEE Energy Conversion Congress and Exposition (ECCE), A Thesis Submitted in Partial Fulfillment of the Requirements for the Degree of Master of Science at the University of Connecticut, 62P., Nov. 7, 2017.
Lee et al. "Electrochemical State-Based Sinusoidal Ripple Current Charging Control", IEEE Transactions on Power Electronics, 30(8):4232-4243, XP11574676A, Aug. 2015.
Vazini et al. "Sinusoidal Charging of Li-Ion Battery Based on Frequency Detection Algorithm by Pole Placement Control Method", IET Power Electronics, 12(3):421-429, Mar. 2019.
Internationaler Recherchenbericht und Schriftlicher Bescheid [International Search Report and the Written Opinion] Dated Jul. 2, 2020 From the International Searching Authority Re. Application No. PCT/AT2020/060155 and Its Translation of Search Report Into English. (15 Pages).

\* cited by examiner

METHOD FOR PROTECTING A BATTERY DEVICE

RELATED APPLICATIONS

This application is a National Phase of PCT Patent Application No. PCT/AT2020/060155 having International filing date of Apr. 16, 2020, which claims the benefit of priority of Austria Patent Application No. A 50350/2019 filed on Apr. 17, 2019. The contents of the above applications are all incorporated by reference as if fully set forth herein in their entirety.

FIELD AND BACKGROUND OF THE INVENTION

The present invention relates to a method for protecting an electrode of a battery device, in particular an electrode of the battery device, a checking device for checking a battery device as well as a computer program product for carrying out such a method.

It is known that battery devices are subject to a certain degree of wear and ageing processes in use. These are in particular attributable to the fact that chemical and physical changes to the electrode or to the electrodes of the battery device take place. These ageing processes are for example based on deposits which build up on one or more electrodes of the battery device. These deposits form a layer which inhibits the transition of ions or electrons at the respective electrode or even prevents this completely in some areas. The thicker the formation of such a layer on the respective electrode surface, the lower the efficiency of this electrode and thus the battery device. Over the service life of the battery device, the thickness of such a layer on a respective electrode increases, so that the efficiency and the capacity of the battery device are reduced.

Known solutions seek to reduce the build-up of these layers on the electrodes or to increase the time required for the layer to build up so that the battery device maintains a higher capacity over a longer period of time. In order to prevent these chemical and physical ageing processes, known solutions use a corresponding temperature control of the battery device in particular. This is because different rates of ageing result at different temperatures in different application situations. However, the use of a targeted temperature control is relatively costly, since energy also needs to be expended for this purpose. If a battery device is located in a vehicle, a part of the energy is thus not made available for the drive power or the operating power, since it is required as protective power for the temperature control of the battery device. This applies not only to an operating situation of the battery device, but also to a storage situation of the battery device. In addition, the protective mechanisms of such temperature control possibilities are limited.

SUMMARY OF THE INVENTION

It is the object of the present invention to remedy, at least in part, the disadvantages described above. In particular, it is the object of the present invention to provide, in a cost-effective and simple manner, an improved protection for a battery device, in particular for the electrodes of a battery device.

The above object is achieved by a method with the features of claim 1, a checking device with the features of claim 16 and a computer program product with the features of the current invention. Further features and details of the invention arise from the dependent claims, the description and the drawings. Naturally, features and details which are described in connection with the method according to the invention also apply in connection with the checking device according to the invention and the computer program product according to the invention and vice versa, so that with regard to the disclosure, mutual reference is or can always be made to the individual aspects of invention.

According to the invention, a method serves to protect an electrode of a battery device, in particular an electrode of the battery device. For this purpose, this method has the following steps:

determining at least one electrical battery parameter of the battery device, in order to determine a respective battery situation of the battery device (100), determining a battery parameter of an operating current of the battery device, calculating a disturbance parameter for a disturbance current on the basis of the operating parameter, generating the disturbance current, applying the disturbance current to the operating current to the one electrode in order to inhibit or reduce an ageing process at the one electrode.

A method according to the invention is based on the idea that the mode of operation of the respective operating current has effects on the battery device, in particular on the electrode or other components of the battery device and their ageing processes. Thus, depending on which current situation is present at the electrode, a corresponding ageing situation will occur on the basis of this current situation. According to the invention, this current situation is determined in that at least one operating parameter of an operating current can be determined. In order to adapt this operating parameter and the operating current to the respective operating situation of the battery device, according to the invention a preceding step of determining an electrical battery parameter of the battery device is provided.

Determining at least one electrical battery parameter is to be understood to mean in particular a basic determination of the battery situation of the battery device. Thus, the electrical battery parameter can for example contain information as to whether the battery device is currently in a charging state or in a discharging state. A hold state when the battery device is not in use can also be defined as an electrical battery parameter. In addition or alternatively, further battery parameters, such as for example the state of charge (SOC), the ageing condition, also called the state of health (SOH) or the like are conceivable according to the present invention. The determination of the battery parameter thus makes it possible to implement or even adapt the method according to the invention on the basis of the current battery situation.

A core idea according to the invention is to generate a disturbance current in addition to the current operating current. This disturbance current is dependent on the operating current, since it deliberately differs from the operating current in terms of at least one current parameter. For example, this is the alternating current component as current parameter with the individual parameters amplitude and frequency added. In order to create this distinction, and in particular to make it possible to adapt the disturbance current to the operating current, a determining step and a calculating step are necessary according to the present invention. On the one hand, at least one operating parameter of the operating current must be determined while the battery device is running. The operating parameter of the operating current is a current parameter of the operating current. For example, the current amplitude and/or the current frequency of the operating current can be determined as operating parameter. At least one disturbance parameter for a disturbance current is now calculated on the basis of this determined operating parameter. In particular, this calculation relates to identical or substantially identical current parameters, so that the disturbance parameter can for example also provide a current amplitude and/or a current frequency for the disturbance current. The disturbance current is then generated on the basis of the calculated disturbance parameter, so that finally the disturbance current can be applied to the operating current.

According to the invention, an application of the disturbance current is therefore established in the battery device on carrying out a method according to the invention, in addition to the operating current. This leads in total to a superposition of the disturbance current on the operating current. Such disturbance currents can also fundamentally be referred to as so-called ripple currents. While such ripple currents are undesirable in known battery devices and the corresponding monitoring methods, they are used deliberately and precisely in a method according to the invention. By forming a disturbance current, advantages can be achieved, in particular in a chemical and/or in physical manner, which inhibit the ageing process on the electrode of the battery device or at least reduce the speed of the ageing.

For example, it is possible, through a disturbance of the operating current through a changed disturbance current, in terms of a changed current amplitude and/or a changed current frequency, to provide a disharmonious situation from a chemical point of view for the individual ion transitions at the electrode. In other words, a continuous current transition at the electrode is terminated and is succeeded by a discontinuous current transition and thus an ion transition at the electrode. This discontinuous configuration, which in particular applies or withdraws the electrons at the electrode in waves and thus intermittently, means that an ion accumulation situation at the electrode can be avoided. Thus, the disharmonious transmission of electrons to the respective electrode of the battery device inhibits or, at least at times, even completely prevents the build-up of a layer on the electrode.

In addition to the effect described above, further physical effects which can be generated at the respective electrode by the disturbance current are also conceivable. For example, these include the actual positioning of the individual ions which, due to the disturbance current, can now provide a lower probability of deposition during the transition at the electrode. In effect this means that, through the superimposition of the disturbance current and the operating current, a reduced rate of ageing can be achieved at the electrode. In addition to the physical effects, chemical effects are also conceivable. For example, these include the influence of the disturbance current on the formation of a deposited layer on the electrode. This is in particular the case at high and/or low temperatures, since an inactivation of lithium ions is inhibited.

As can be seen from the above explanation, a wide range of different effects can be taken into account, and in this way the rate of ageing of the electrode of the battery device can be reduced or even partially inhibited. This is attributable to the fact that according to the invention a defined disturbance current is superimposed on the operating current. This disturbance current is not generated indiscriminately, but is based on the current situation of the operating current, so that a disturbance parameter can adapt the disturbance current to the respective operating situation. Preferably, the already determined at least one electrical battery parameter of the battery device is also included in the calculation of the disturbance parameter. In particular, the disturbance parameter is thereby different from the operating parameter of the respective operating current.

It can be advantageous if, in a method according to the invention, the disturbance parameter differs from the operating parameter and in particular comprises one of the following current parameters:

current amplitude
current frequency

The above list is not intended to be definitive. Naturally, two or more such parameters can also be combined together in a disturbance parameter, or a plurality of disturbance parameters and operating parameters can be used. The distinction between disturbance parameter and operating parameter with regard to the quantitative numerical value supports the disturbance function according to the invention, as has been explained in detail. The distinction between at least an operating parameter and disturbance parameter means that a resulting current situation can be generated which differs from the operating situation where operating current is used exclusively. In this way, the effects from a chemical and physical point of view explained in the introduction can be achieved precisely and preferably in a predefined way. In this way, a so-called ripple current with regard to disharmonic or asymmetric frequency and correspondingly different amplitudes can for example be actively provided.

A further advantage can be achieved if, in a method according to the invention, the determination of the at least one operating parameter and/or of the at least one battery parameter takes place on the basis of at least one measured sensor value. For example, a sensor device may be provided which is able to determine a sensor value in a direct or indirect manner. In the simplest case, such a sensor value can indicate the current operating state of the battery device. For example, the charging state can be distinguished from a discharging state of the battery device. Such a sensor device can be arranged directly on the battery device or in another position in the situation of use, for example in a vehicle. In addition, the corresponding sensor value can also be used for the determination of the operating parameter, for example through corresponding measurement of the individual current parameters of the operating current.

It is also advantageous if, in a method according to the invention, the determination of the at least one operating parameter and/or of the at least one battery parameter takes place at least partially on the basis of a simulation model. A simulation model is in particular a mathematical or computer-based simulation model. Such a use of a simulation model also makes it possible to consider more complex possibilities than would be possible with the consideration of sensor values alone. Simulation models can for example be determined or generated using test benches of the battery device. Naturally, the use of large data sets and the purely mathematical generation of a simulation model are also conceivable within the context of the present invention. In principle, sensor values and simulation models can also be used in combination in a method according to the invention. Such a simulation model can be used as a purely numerical model, but also as a flexible model, for example using artificial intelligence and thus using so-called neural networks.

Further advantages are provided if, in a method according to the invention, the disturbance parameter comprises a current frequency of the disturbance current which is in particular less or substantially less than 1 kHz. The disturbance parameter preferably has a current frequency which is in addition greater than a corresponding operating frequency as an operating parameter of the operating current. The highest frequency thereby lies in particular within a high frequency range for the disturbance parameter between for example around 0.5 kHz and around 1 kHz. For the disturbance parameter, the current frequency of the disturbance current is in particular independent of the amplitude of the disturbance current.

It is furthermore advantageous if, in a method according to the invention, a comparison of the real impedance and the imaginary impedance of the battery device takes place when calculating the disturbance parameter. The real impedance is to be understood as the real impedance of the battery device in the respective situation. The imaginary impedance is based on the respective simulation of the battery device in the respective battery situation. An additional influence can be applied in calculating the disturbance parameter through the correlation of the real impedance and the imaginary impedance. In particular, this makes it possible to adapt the disturbance parameter even more precisely to the current battery situation, so that the chemical and/or physical protective mechanisms can be achieved even more specifically and effectively on introducing the disturbance current.

In addition, it is advantageous if, in a method according to the invention according to the preceding paragraph, during the comparison a range of a local minimum is selected for the calculation of the disturbance parameter, in particular in the form of a current frequency. Such a local minimum is also formed in particular as an absolute minimum. In this embodiment, an impedance curve shows different correlations between real impedance and imaginary impedance in different frequency ranges. The selection of a local minimum for the imaginary impedance over the real impedance means that a further advantage according to the invention with regard to the manner of chemical and physical protection can be achieved in an improved way.

It can also be advantageous if, in a method according to the invention according to one of the preceding two paragraphs, an impedance curve specific to the determined battery parameter and/or the specific operating parameter is used for the comparison of the real impedance with the imaginary impedance of the battery device. As already explained in the introduction, an adaptation of the method according to the invention to the current operating situation of the battery device can also be carried out in this way. Thus, different impedance curves can for example distinguish the charging state from the discharging state of the battery device. However, different current strengths and current frequencies are also conceivable which lead to different impedance curves and thus have a different influence on the comparison result with this embodiment. The different impedance curves can for example also be made available as a simulation model, and preferably generated by test bench tests. That is to say, such a set of two or more impedance curves means that the method according to the invention can achieve the protective advantages for the electrode according to the invention even more precisely and specifically.

It is furthermore advantageous if, in a method according to the invention, at least one absolute limit is adhered to when calculating the disturbance parameter. Such an absolute limit is in particular an absolute upper limit. However, in addition or alternatively, an absolute lower limit is conceivable according to the present invention. Preferably, a limit corridor within which the respective disturbance parameter should be located is provided by at least two absolute limits. If two or more disturbance parameters, for example a disturbance frequency and a disturbance amplitude are used, then naturally a corresponding limit definition can be provided for each of these disturbance parameters. The result is that, on the one hand, undesirable side effects and above all also damage effects in the event of excessively large disturbance parameters can be limited or even completely ruled out.

It is also advantageous if, in a method according to the invention according to the preceding paragraph, half, in particular a third of the present current amplitude of the operating current is used as absolute limit for a disturbance parameter in the form of a current amplitude as upper limit. This also means that the current strength for the disturbance current is less than the current strength for the operating current. Among other things, this means that, through the combination of operating current and disturbance current, the maximum amplitude, as a combined amplitude, provides protection from too high a load on the individual components of the battery device. In addition, it also makes it possible to achieve an optimisation between operating protection and electrode protection. Naturally, in addition to a pure control method, a regulation method can also be used here in order as a result to be able to monitor and adjust the combination amplitude.

A further advantage is achievable if, in a method according to the invention, at least one electrical secondary component with its own current demand is inserted in the circuit of the battery device in order to generate the disturbance current. Such a secondary component is an electrical consumer which is inserted in the circuit of the battery device. These can be standard consumers or consumers which are provided explicitly for a method according to the invention. However, the use of existing consumers, and in particular consumers which are actually used in the respective situation is preferable. Thus, the use of an existing consumer can be sufficient to provide the corresponding disturbance current without additional current demand. In other words the respective, in particular active, secondary component is selected as the generating module to generate the disturbance current on the basis of the calculated disturbance parameter and, through its inclusion in the circuit of the battery device, to apply it to said circuit. Naturally, when generating the disturbance parameter and thus generating the disturbance current the respective limit load of this generating secondary component is taken into account in order to avoid undesirable damage or disadvantageous influences on the secondary component, or at least to minimise these as far as possible.

It is advantageous if, in a method according to the preceding claim, an inverter in the circuit of the battery device is used as secondary component. A particularly great advantage is the correspondingly high power of the inverter, which means that a large bandwidth is available to generate a wide range of different disturbance currents with regard to disturbance parameters in the form of the current amplitude and/or the current frequency. In this case too, as has already been explained in the previous paragraph, damage frequencies and damage amplitudes for the inverter are avoided.

Further advantages are achievable if, in a method according to the invention, at least two secondary components are, at least at times, used in parallel, in time, in order to generate the disturbance current. An at least partial temporal overlap means that the secondary components can provide a larger bandwidth during the temporal overlap in order to adapt and provide the respective disturbance current. This relates in particular to the maximum possible amplitude and/or frequency of the disturbance current. Naturally, two or more secondary components can also carry out a method according to the invention completely downstream of one another and without temporal overlap.

Further advantages can be achieved if, in a method according to the invention, the at least two secondary components are operated with synchronous or essentially synchronous disturbance current. This means that an additive effect is provided which in particular tends to lead to an increased current amplitude of the disturbance current. The combination of synchronously operated secondary components leads, so to speak, to a joint amplification of the disturbance current and can provide the desired current strength as amplitude for the disturbance current with a low power output of the individual secondary component.

It can also be advantageous if, in a method according to the invention, the at least two secondary components are operated with asynchronous or substantially asynchronous disturbance current. This can also be understood as the formation of two different disturbance currents which are applied together to the operating current. This results, so to speak, in a double disturbance current or a double ripple current. This serves in particular to disturb the respective frequency in order to provide a superimposed protective effect. With regard to the chemical and physical protective effects, the advantages described can be further enhanced.

The subject matter of the present invention also includes a checking device for checking a battery device in a manner according to the invention. Such a checking device has a determining module for determining at least one electrical battery parameter of the battery device to determine a respective battery situation of the battery device and for determining an operating parameter of an operating current of the battery device. Furthermore, a calculating module is provided for calculating a disturbance parameter for a disturbance current on the basis of the operating parameter, wherein the disturbance parameter is determined by comparing the real impedance of the battery device in the respective battery situation and the imaginary impedance based on a respective simulation of the battery device in the respective battery situation. The checking device is further equipped with a generating module for generating the disturbance current and an application module for applying the disturbance current to the operating current for application to one electrode of the battery device in order to inhibit or reduce an ageing process at the one electrode, According to the invention, the operating module, the calculating module and/or the generating module and/or the application module are designed for the implementation of a method according to the invention. Thus, a checking device according to the invention brings the same advantages as have been explained in detail with reference to a method according to the invention. Such a checking device can for example be used with stationary battery devices. However, a use with mobile battery devices, in particular with battery devices in vehicles is also conceivable in principle. Not least, such a checking device can also be used on a test bench of a battery device in order for example to create the simulation models which have already been explained.

A further subject matter of the present invention is a computer program product comprising commands which, when the program is run on a computer, cause this to carry out the method according to the present invention. Thus, a computer program product according to the invention brings the same advantages as have been explained in detail with reference to a method according to the invention.

BRIEF DESCRIPTION OF THE SEVERAL VIEWS OF THE DRAWINGS

Further advantages, features and details of the invention are explained in the following description, in which exemplary embodiments of the invention are described in detail with reference to the drawings. In each case schematically.

DESCRIPTION OF SPECIFIC EMBODIMENTS OF THE INVENTION

Figure 1:
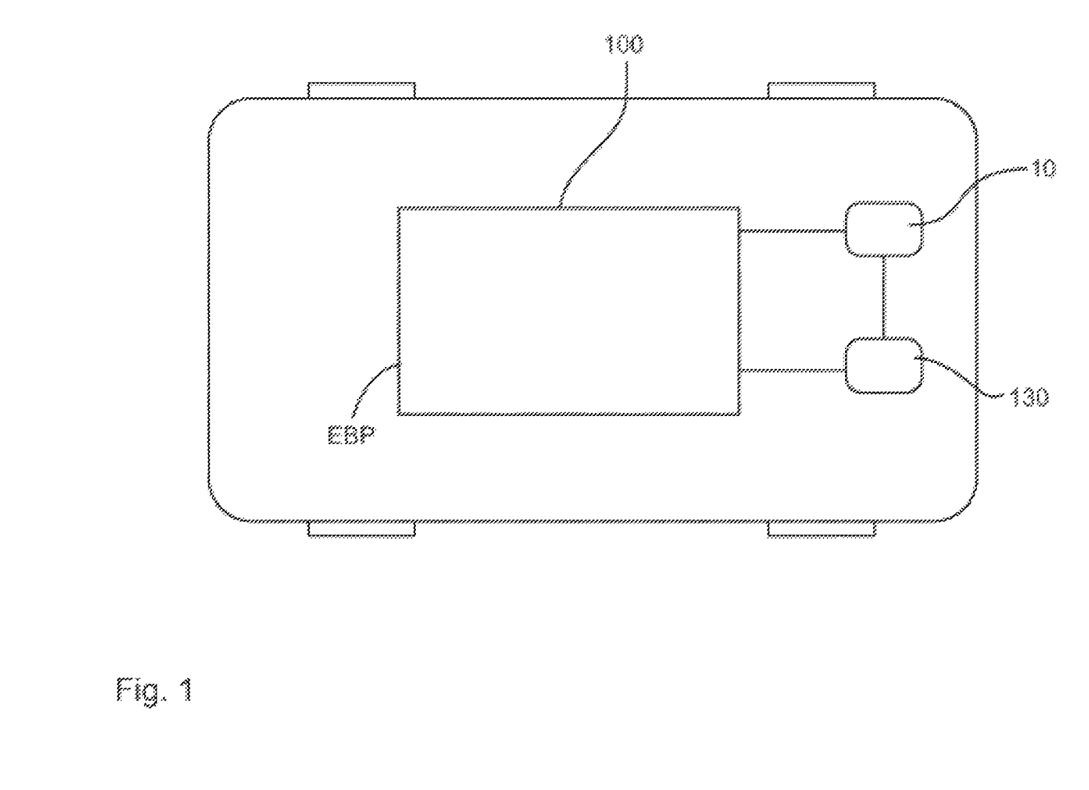
FIG. 1 shows an embodiment of a battery device according to the invention

FIG. 1 shows, schematically, a vehicle as an example of use of a battery device 100. The battery device 100 has numerous individual battery cells, each of which is equipped with two electrodes. Depending on which operating mode the vehicle and thus also the battery device 100 is in, the battery device 100 can be assigned an electrical battery parameter EBP. For example, this can be a charging state, a discharging state, a current state of charge (SOC) or for example an ageing condition (state of health—SOH). For the monitoring of the battery device 100, a checking device 10 is shown here schematically, as well as at least one secondary component 130 in the circuit of the battery device 100. The secondary component 130 can be an electrical consumer, for example in the form of an inverter for the battery device 100.

Figure 2:
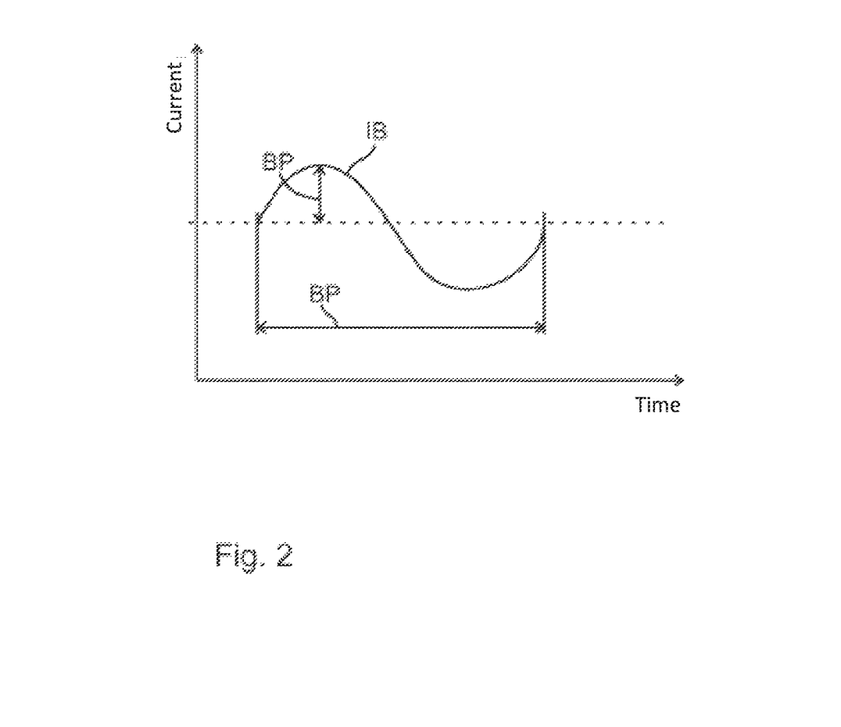
FIG. 2 shows a situation with operating current.
Figure 3:
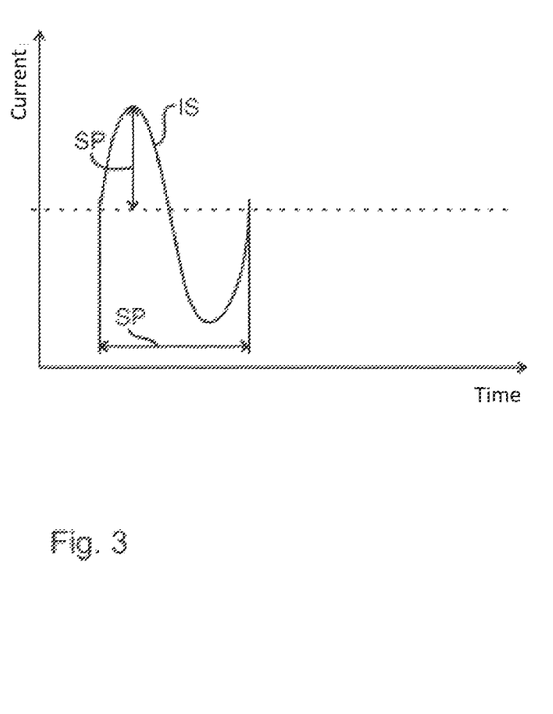
FIG. 3 shows a situation with disturbance current.

FIGS. 2 and 3 show, schematically, the fundamental concepts behind the functioning of a method according to the invention. Starting from the battery device 100 shown in FIG. 1, a determining step can now be carried out with the checking device 10. In a first step, the determining module 20, as shown for example in FIG. 4, will now determine the electrical battery parameter EBP of the battery device 100. This is followed by a determining step for the operating parameter BP or at least one operating parameter BP of the operating current IB. This is shown schematically in FIG. 2. FIG. 2 shows a period of a current frequency of the operating current IB. In this case the operating current IB can have operating parameters BP, in particular with regard to two current parameters.

This is, on the one hand, half the amplitude size in the positive sense of the operating current IB. The frequency, i.e. the length of a period of the operating current IB, is also shown here schematically as the operating parameter BP. One or both or even further combinations of current parameters of the operating current IB can now be determined by the determining module 20 and serve as a basis for the further method.

FIG. 3 shows how a disturbance parameter SP is provided on the basis of the operating current IB and the determined operating parameter BP. In this embodiment, this generation of the disturbance parameter SP is based on a generation of different current parameters in comparison to the operating current B. In the example in FIG. 3, this leads to a larger amplitude being generated as the first disturbance parameter SP and a shorter frequency or length of the period being generated as the second disturbance parameter SP. On the basis of these two disturbance parameters SP, a disturbance current IS according to FIG. 3 can be generated which is then applied to the operating current according to FIG. 2. If the current situation according to FIG. 2 is now combined with the current situation according to FIG. 3, a relation current or a combination current is established which has the desired disharmonious effects on the respective electrode of the battery device 100, so that the corresponding protective effect can be achieved from a chemical and/or physical point of view. In addition to the embodiment shown in FIGS. 2 and 3, it would naturally also be sufficient in principle to change only a single form of the current parameter, or of a single current parameter, between the operating current 18 and the disturbance current IS.

Figure 4:
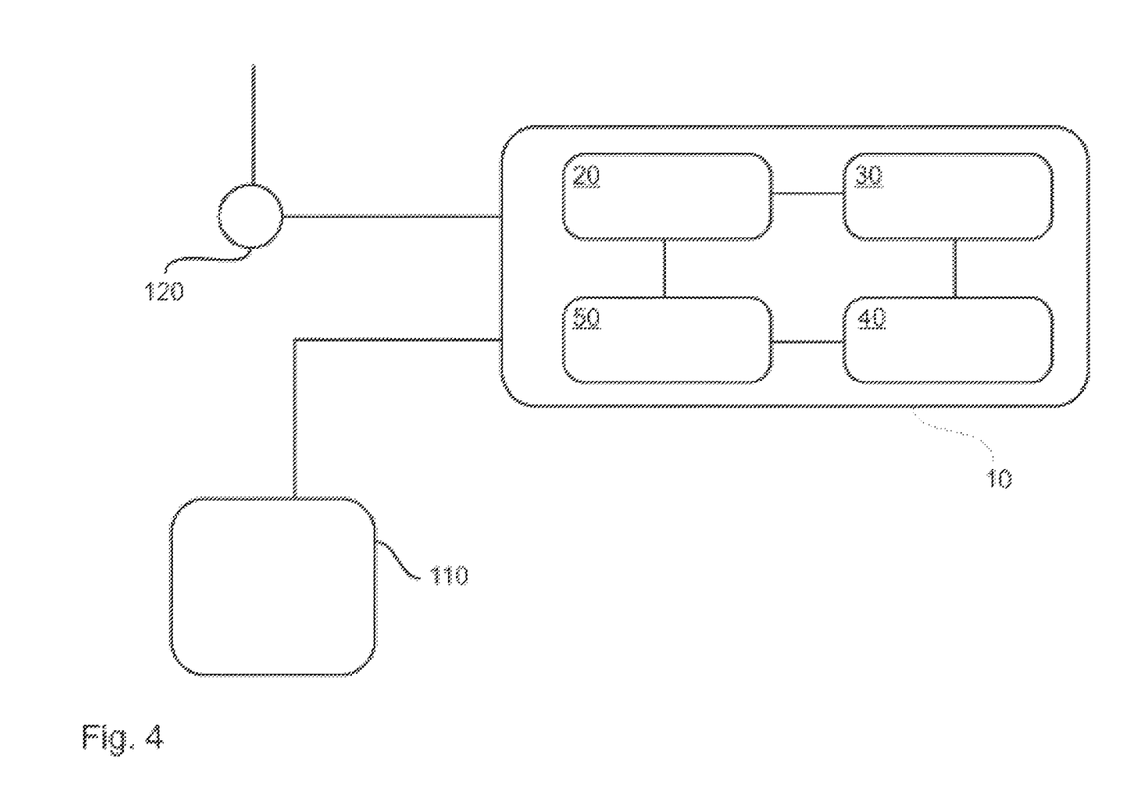
FIG. 4 shows an embodiment of a checking device according to the invention.

FIG. 4 shows, schematically, the embodiment of a checking device 10. In order to ensure the individual steps of determining, calculating, generating and application, the checking device 10 is equipped here with a determining module 20, a calculating module 30, a generating module 40 as well as an application module 50. A simulation model 110 as well as a sensor device 120 are in addition provided here as input variables and/or for use during the individual method steps.

Figure 5:
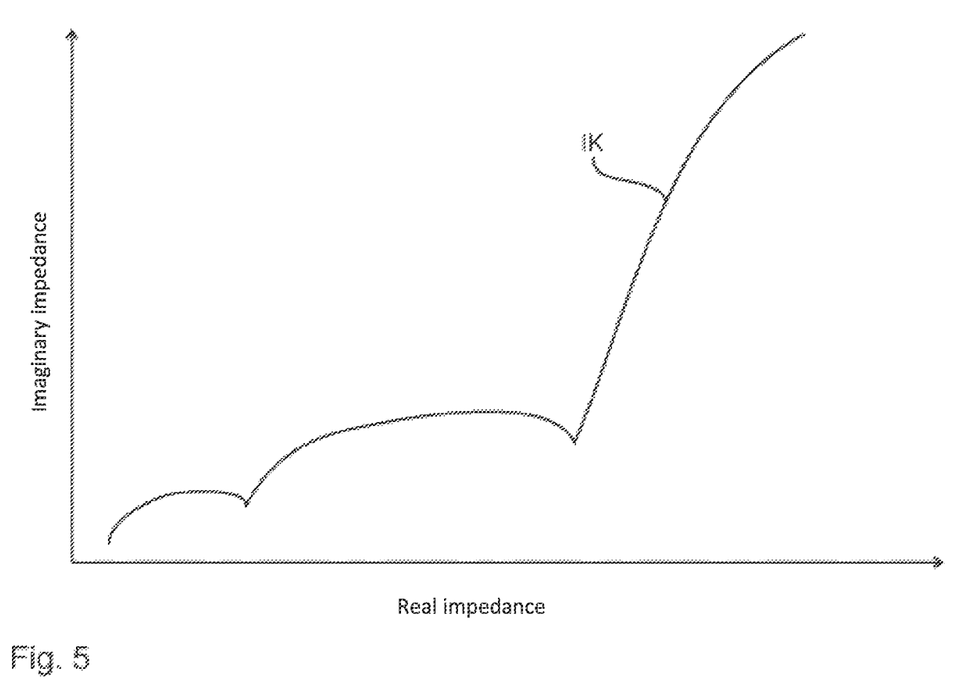
FIG. 5 shows a possibility of an impedance curve.

One possibility for the selection of a corresponding disturbance parameter SP is the use of an impedance curve IK as shown in FIG. 5. Here, the real impedance is correlated with the imaginary impedance of the battery device 100. As can be seen clearly from FIG. 5, two local minimums are formed here which are preferred ranges for the selection of the disturbance parameter SP. In particular, the impedance curve IK (not shown in FIG. 5) is coupled with corresponding frequency ranges, so that, on the basis of the selection of the local minimum, a corresponding frequency range can also be selected as disturbance parameter SP for the disturbance current IS.

The above explanation of the embodiments describes the present invention exclusively in the context of examples. Naturally, individual features of the embodiments can, where technically expedient, be freely combined with one another without departing from the scope of the present invention.

REFERENCE SIGNS 10 checking device
20 determining module
30 calculating module
40 generating module
50 application module
100 battery device
110 simulation model
120 sensor device
130 secondary component
EBP Electrical Battery Parameter
BP operating parameter
IB operating current
SP disturbance parameter
IS disturbance current
IK impedance curve

The invention claimed is:

1. Method for protecting an electrode of a battery device (100), in particular an electrode of the battery device (100), having the following steps:
   determining at least one electrical battery parameter (EBP) of the battery device (100), in order to determine a respective battery situation of the battery device (100),
   determining an operating parameter (BP) of an operating current (IB) of the battery device,
   calculating a disturbance parameter (SP) for a disturbance current (IS) on the basis of the operating parameter (BP),
   wherein the disturbance parameter is one or more of frequency and amplitude, the disturbance parameter is calculated by comparison of the real impedance of the battery device (100) in the respective battery situation and the imaginary impedance based on the respective battery situation, and
   wherein the comparison of the real and imaginary impedance forms an impedance curve, the impedance curve having local minimums defining a range of disturbance parameter frequency,
   wherein the disturbance parameter is different from the respective operating parameter of the operating current of the battery device,
   generating the disturbance current (IS), and
   applying the disturbance current (IS) with the operating current (IB) to the one electrode in order to inhibit or reduce an ageing process at the one electrode.

2. Method according to claim 1, characterised in that the disturbance parameter (SP) differs from the operating parameter (BP) and in particular comprises one of the following current parameters:
   current amplitude
   current frequency.

3. Method according to claim 1, characterised in that the at least one operating parameter (BP) and/or the at least one electrical battery parameter (EBP) is determined on the basis of at least one measured sensor value.

4. Method according to claim 1, characterised in that the at least one operating parameter (BP) and/or the at least one electrical battery parameter (EBP) is, at least partially, determined on the basis of a simulation model (110).

5. Method according to claim 1, characterised in that the disturbance parameter (SP) has a current frequency of the disturbance current (IS) which is in particular less or substantially less than 1 kHz.

6. Method according to claim 1, characterised in that, during the comparison, a range of a local minimum, in particular in the form a current frequency, is selected for the calculation of the disturbance parameter (SP).

7. Method according to claim 1, characterised in that an impedance curve (IK) specific to the determined electrical battery parameter (EBP) and/or the determined operating parameter (BP) is
   used for the comparison of the real impedance of the battery device (100) in the respective battery situation with the imaginary impedance based on a respective simulation of the battery device (100) in the respective battery situation, wherein the specific impedance curve is determined on the basis of at least one of the determined electrical battery parameter (EBP) and the determined operating parameter (BP).

8. Method according to claim 1, characterised in that at least one absolute limit is adhered to when calculating the disturbance parameter (SP).

9. Method according to claim 8, characterised in that half, in particular a third of the present current amplitude of the operating current (IB) is used as absolute limit for a disturbance parameter (SP) in the form of a current amplitude as upper limit.

10. Method according to claim 1, characterised in that at least one electrical secondary component (130) with its own current demand is inserted in the circuit of the battery device (100) to generate the disturbance current (IS).

11. Method according to claim 10, characterised in that an inverter in the circuit of the battery device (100) is used as secondary component (130).

12. Method according to claim 10, characterised in that at least two secondary components (130) are, at least at times, used in parallel, in time, in order to generate the disturbance current (IS).

13. Method according to claim 12, characterised in that the at least two secondary components (130) are operated with synchronous or substantially synchronous disturbance current (IS).

14. Method according to claim 12, characterised in that the at least two secondary components (130) are operated with asynchronous or substantially asynchronous disturbance current (IS).

15. Checking device (10) for checking a battery device (100), comprising:
- a determining module (20) for determining at least one electrical battery parameter (EBP) of the battery device (100) and for determining an operating parameter (BP) of an operating current (IB) of the battery device,
- a calculating module (30) for calculating a disturbance parameter (SP) for a disturbance current (IS) on the basis of the operating parameter (BP),
- wherein the disturbance parameter is one or more of frequency and amplitude, the disturbance parameter is calculated by comparison of the real impedance of the battery device (100) in the respective battery situation and the imaginary impedance based on the respective battery situation,
- wherein the comparison of the real and imaginary impedance forms an impedance curve, the impedance curve having local minimums defining a range of disturbance parameter frequency,
- wherein the disturbance parameter is different from the respective operating parameter of the operating current of the battery device,
- wherein a comparison of the real impedance of the battery device (100) in the respective battery situation and the imaginary impedance based on a respective simulation of the battery device (100) in the respective battery situation is carried out for the calculation of the disturbance parameter (SP), and
- a generating module (40) for generating the disturbance current (IS) and an application module (50) for applying the disturbance current (IS) to the operating current (IB).

16. Checking device (10) according to claim 15, characterised in that the determining module (20), the calculating module (30), the generating module (40) and/or the application module (50) are designed for the implementation of a method with the features of one of the claim 1 having the following steps:
- determining at least one electrical battery parameter (EBP) of the battery device (100),
- determining an operating parameter (BP) of an operating current (IB) of the battery device,
- calculating a disturbance parameter (SP) for a disturbance current (IS) on the basis of the operating parameter (BP),
- generating the disturbance current (IS), and
- applying the disturbance current (IS) to the operating current (IB).

* * * * *